United States Patent Office.

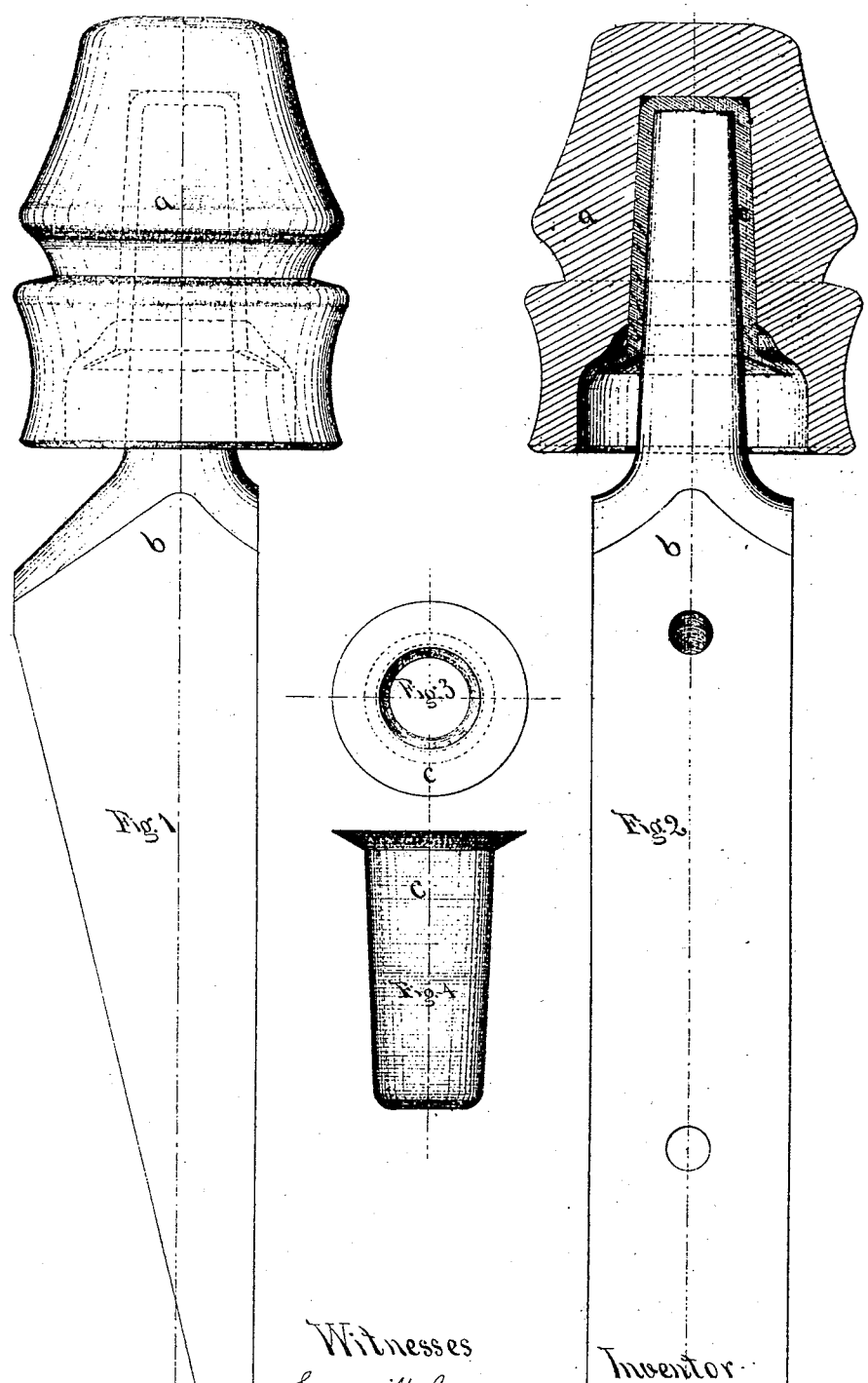

CHARLES A. BUSH, OF NEW LONDON, ASSIGNOR, FOR TWO-THIRDS OF HIS RIGHT, TO HENRY P. OSTRUM AND T. CLIFFORD BUSH, OF NEW HAVEN, CONNECTICUT.

Letters Patent No. 96,198, dated October 26, 1869.

IMPROVED INSULATOR FOR TELEGRAPH-WIRES.

The Schedule referred to in these Letters Patent and making part of the same.

I, CHARLES A. BUSH, of the town of New London, in the county of New London, and State of Connecticut, have invented certain Improvements in Insulators, of which the following is a specification.

My invention relates to the application of a rubber cap or covering to a bracket or pintle, or the insertion of a rubber lining in glass, porcelain, or other non-conducting substance, in such a manner that electricity shall not escape by means of the bracket or pintle or through the glass, porcelain, or other substance, in which there may be cracks or other imperfections.

The object of my invention being to prevent the escape of electricity, to deaden the sound caused by the vibration of the wires, and to hold the glass, porcelain, or other substance securely to the bracket or pintle—

Figure 1 is a side elevation of what embodies my invention.

Figure 2 is a longitudinal section of the same.

Figures 3 and 4 are a plan and an elevation of C, which is shown in section in fig. 2.

A is the glass, porcelain, or other substance.

$b$ is the pintle or bracket, upon which is placed the rubber cap or covering C, or which is forced into the rubber lining C, inserted in A.

The rubber cap, covering, or lining $c$ has, at the bottom, a flange, which is smaller than that part of the cavity in A to which it reaches, so that when any moisture gets inside, it cannot form a conductor that will reach the pintle or bracket.

This flange also prevents rain or snow from beating inside far enough to injure the perfection of the insulation, and hinders spiders from weaving webs, which serve, by means of moisture which accumulates thereon, to conduct off the electricity.

I claim, as my invention—

1. The rubber cap or covering for the bracket or pintle, substantially as and for the purpose hereinbefore set forth.

2. The rubber lining for glass, porcelain, or other non-conducting substance, substantially as and for the purpose hereinbefore set forth.

CHAS. A. BUSH.

Witnesses:
EDWIN M. CORYELL,
PHILO P. BUSH.